Figure 6:
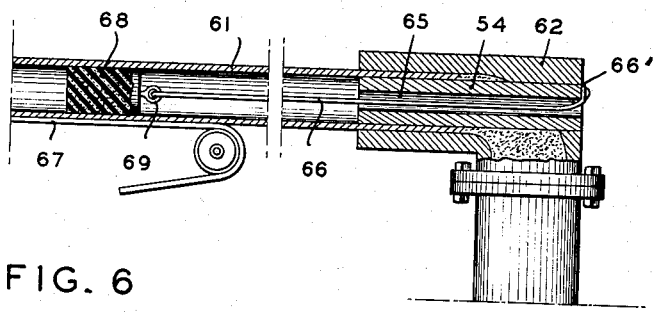

Dec. 29, 1953
C. E. SLAUGHTER
2,663,904
EXTRUSION OF THERMOPLASTICS
Filed Dec. 12, 1950
2 Sheets-Sheet 1
FIG. 1
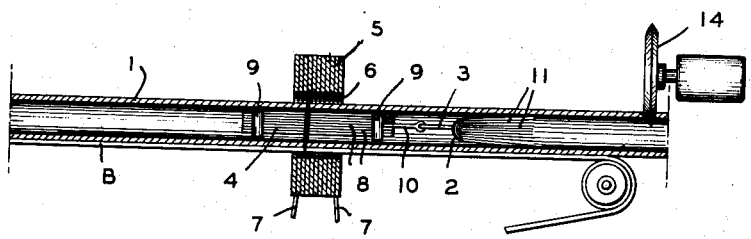
FIG. 2
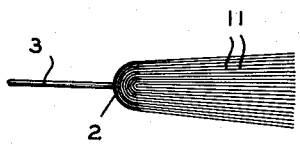
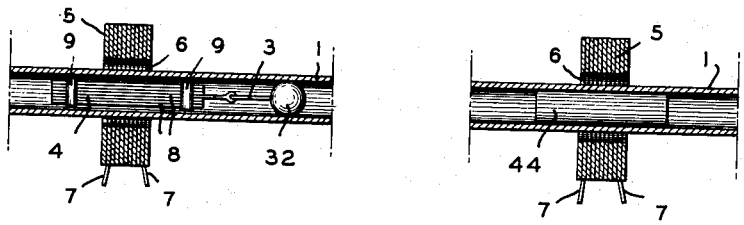
FIG. 3
FIG. 4
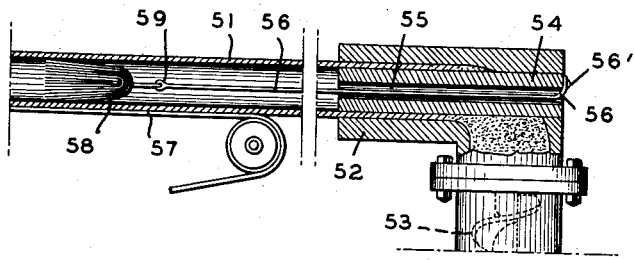
FIG. 5
INVENTOR
CHARLES E. SLAUGHTER
BY  Sol Shapiro
ATTORNEY Dec. 29, 1953

C. E. SLAUGHTER 2,663,904

EXTRUSION OF THERMOPLASTICS

Filed Dec. 12, 1950

2 Sheets-Sheet 2

INVENTOR
CHARLES E. SLAUGHTER

BY Sol Shapperio

ATTORNEY

Patented Dec. 29, 1953

2,663,904

UNITED STATES PATENT OFFICE 2,663,904

EXTRUSION OF THERMOPLASTICS

Charles E. Slaughter, New Canaan, Conn., assignor to Extruded Plastics, Inc., a corporation of Connecticut Application December 12, 1950, Serial No. 200,344

8 Claims. (Cl. 18—14)

This invention relates to synthetic resinous tubing of substantially uniform character and to methods and machines for making the same.

In the extrusion of thermoplastic tubing considerable difficulty has been experienced in the production of such tubing of large internal bore or diameter and also in cases of smaller diameter tubing where the wall of the tube is insufficient in thickness to prevent collapse during the course of manufacture. For example, in one method of extrusion, the tubing from the regular extrusion die is passed directly into a water bath set at a predetermined temperature, which bath exhibits two different effects on the tubing. The low temperature of the water compared with that of the hot plastic, hardens it to a predetermined shape and so prevents collapse of the tubing from the effect of gravity. At the same time, however, the pressure exerted by the water tends to make the tubing collapse since the external pressure, due to the surrounding water, is greater than the internal pressure.

In small diameter tubing, as for instance, ¼ inch O. D. with a 1/32 inch wall, or even in the larger diameter tubing, such as ¾ inch but with a very small bore, as for instance, ¼ inch bore, the pressure exerted by the water is insufficient to cause deformation; but in the thinner walls, especially in the larger diameters, this collapse is very serious. To overcome this external water pressure, it is necessary to balance the internal pressure exactly against the external pressure.

One expedient to balance these pressures is to extrude the tubing vertically into water or other coolant while blowing air through the core of the die to balance the column of water around the tube. This expedient requires expensive installation since it is necessary to extrude from a height of not less than 20 feet in order to obtain a standard commercial 12 foot length, and in addition the problem of cutting off to length is very difficult since this must be carried out while the tubing is submerged to a depth of 8 or 10 feet.

A further expedient which may be used with very flexible types of tubing, such as polyvinyl resins, etc., consists of sealing the tube and blowing air into it. When it is necessary to cut the tubing to length, the tube is resealed just before the cut. This is most unsatisfactory as it is impossible to control the air pressure exactly and further, this process is not commercially possible on the rigid types of resins, such as the styrenes, acetate butyrates, unplasticized vinyls, etc.

Nor has it proved particularly satisfactory to seal the end of the tube with a stopper such as a rubber cork provided with a small hole cut through its length to permit a small stream of air to pass through, while at the same time building up sufficient back pressure so that the internal pressure exerted by the air and the external pressure exerted by the water are balanced. Even with this expedient the tubing cannot be cut without causing a collapse, which collapse while not so serious in the smaller diameter tubing, involving a waste of a few feet of misformed tubing, is so serious with larger diameter tubing such as 1 inch and above, that the process is uneconomical.

In such tubing where the ratio of wall thickness to internal bore is insufficient to prevent collapse of the tubing when the resinous material is in plastic condition during the extrusion process or to prevent substantial variation in external diameter from a given predetermined size, difficulties are encountered. For example, even in small diameter tubing of say ⅜ inch O. D. x ¼ inch I. D. it has not been possible to maintain the desired tolerances in diameter. In larger size tubing, as for example, one inch in diameter and above, the difficulties were insuperable and no such large size tubing has heretofore been made.

Among the objects of the present invention is the production of extruded synthetic resinous tubing of substantial uniformity throughout its length.

Further objects include the production of such tubing of large size diameter.

Further objects and advantages of the present invention will appear from the more detailed description set forth below, it being understood that this more detailed description is given by way of explanation and illustration only, and not by way of limitation, since various changes therein may be made by those skilled in the art without departing from the scope and spirit of the present invention.

Figure 7:
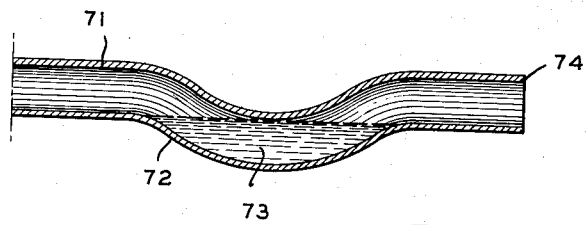
Figure 8:
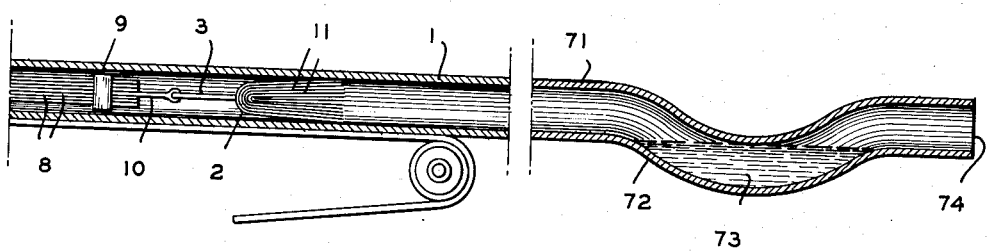

In connection with that more detailed description, there is shown in the accompanying drawing, in Figure 1, an elevation, partly in section, illustrating one device that may be employed in accordance with the present invention; in Figure 2, a detail of a floating plug shown in Figure 1; in Figure 3, a modified form of apparatus that can be utilized in accordance with the present invention; in Figure 4, a further modification of apparatus that can be employed in carrying out the present invention; in Figure 5, a section through a cross-head type of extrusion machine utilized in accordance with the present invention; in Figure 6, a section through a cross-head type of extrusion machine using a porous mass as a floating plug; in Figure 7, a section through extruded tubing illustrating a further modification of the invention; and in Figure 8, a still further modified form of apparatus.

In accordance with the present invention extruded synthetic resinous tubing is produced in continuous lengths of uniform cross-section maintained within close tolerances, particularly where the ratio of wall thickness of the tubing to its internal bore is insufficient to prevent collapse of the tubing when the resinous material is in plastic condition during the extrusion process. Tolerances within limits of plus or minus one-half of one per cent are readily maintained by the present invention. In small size tubing this will be less than .005 inch and tubing may be readily produced which does not vary in cross-section throughout the length of the tubing more than from .001 inch to .002 inch. Such tubing, for example, may be of a size ⅜ inch O. D. x ¼ inch I. D. and in lengths of 1000 feet. The invention is particularly useful in the production of uniform thin walled tubing of at least ½ inch I. D. and specifically above ¾ inch O. D. There is also included large diameter tubing of 1 inch or more diameter running to 3 inches in diameter and higher.

In accordance with the present invention, collapse of tubing of extruded thermoplastic type while in non-self-sustaining plastic condition, is prevented by introducing a fluid such as air within the tubing, and the fluid pressure is maintained substantially uniform to obtain tubing held to close tolerances. The pressure is maintained during extrusion and cooling desirably between the points of extrusion and cutting either by a floating plug or by a porous or semi-permeable mass anchored in position in the tubing or in other ways.

As illustrated in Figure 1, the extruded thermoplastic tubing 1 after extrusion from the usual extruding die (not shown) and immersion in a cooling bath such as water (not shown), is received on the belt conveyor B. The usual means (not shown) is utilized for introducing fluid pressure such as air pressure, within the tube 1 by appropriate means within the die, as through a cross-head.

A plug 2 is floated within the tubing 1 at some convenient position between the points of extrusion and cutting and may be maintained within the tubing 1 by being anchored by the strand 3 to a magnetizable core 4. A solenoid 5 of annular cross-section has a central opening 6 within which the extruded tubing 1 may pass freely, electrical connections 7 being provided for the solenoid 5. The core 4 may consist of a number of lengths of Swedish iron wire 8, held together by bands 9, one of the wires such as 10 extending beyond the core and connected to the strand 3 to which the plug 2 is attached.

Desirably the plug 2 consists of a number of woolen strands 11.

Strands of wool may desirably be used for the tail or plug 2 as it has been found that the static electricity generated by the plastic traveling over the rubber conveyor belt, holds the strands of wool in contact with the internal surface of the plastic and permits internal pressure of the fluid or air to be maintained within close limits such as plus or minus one inch of water pressure. The plug or tail 2 may thus be said to float within the tubing 1 while the latter is being carried forward by the conveyor belt B and yet effectively seals the fluid pressure within the extruded tubing 1 so that when the tubing passes to the cutting or shearing element 14 the pressure is maintained within the tubing while it is being extruded and prevents any collapse.

The form of device, and means for floating the plug or tail within the tubing, including the tail itself of woolen strands, the solenoid, and the core may be replaced by other means and expedients, so long as a floating plug is maintained within the tubing to retain the necessary pressure to prevent collapse of the tubing. The method and means illustrated may be utilized in producing tubing of any desired internal bore or diameter and for the first time makes it possible to extrude thermoplastics, particularly synthetic resinous tubing of relatively large internal diameter, such as 1 inch, 1½ inch and larger. If desired, particularly in the case of the larger size extruded tubing, or in event where desired, several floating plugs may be positioned within the tubing at any desired points.

It is desirable to place the plug for maintaining the pressure within the tubing, at a substantial distance from the extrusion die since in this way, there is provided a comparatively large volume of entrapped air between the point of extrusion and the point where the plug is positioned, and this comparatively large volume of entrapped air within the tube acts as an air cushion and takes up any minor variation in air pressure that may occur through minor changes in inside diameter or any other changes which give rise to fluctuations.

In the form of device illustrated in Figure 3, in lieu of utilizing a woolen strand tail or plug as illustrated in Figures 1 and 2, there is illustrated a device in which a solid plug is utilized both for the purpose of maintaining the desired fluid pressure within the tubing during extrusion, and also to control the size of the tubing produced very closely.

Desirably the tubing may be reheated at any pre-determined length from the die and the plug used at that point, in order to provide an adequate air cushion. The plug in these instances may be a cylindrical rod, ball, or any other shape desired, desirably of non-magnetic material attached as a tail to the laminated iron core. Means for permitting a stream of air to pass the plug is desirably provided. As shown in Figure 3, a ball 32 is employed, having the desired diameter. By utilizing a sufficiently strong magnetic field, the extruded tubing is pulled over the ball 32 and expanded by a few thousandths of an inch to obtain the true internal bore desired.

In the modification shown in Figure 4, the plug is shown as of magnetizable material which is maintained in position by the solenoid, for the purpose of retaining the necessary fluid pressure within the tubing 1. In this case the plug consists of magnetizable material, for example, in the shape of a cylinder 44 having a perforation, the cylinder floating within the tubing 1 maintained in position by the solenoid 5. Here again as in the device of Figure 3, the machine of Figure 4 is employed at a point where the tubing is semi-plastic so that the plug serves not only to maintain the air pressure in the tubing 1, but also to shape the internal bore of the tubing to the true bore desired.

The standard type of extrusion machine of the cross-head type may be modified for use in accordance with the present invention and other means for positioning the floating plug may be employed as shown in Figure 5. Such machines are particularly useful in the production of large diameter tubing to secure a more even flow of material around the core in the die. As shown in Figure 5, the tube 51 is extruded from the die 52 into which the plastic material is fed by the worm 53 around the core 54, a centrally placed orifice or opening 55 permitting the introduction of air to support the tube during extrusion.

While a floating plug of any desired type as illustrated in Figures 1–4 may be utilized as explained hereinabove, other expedients may be utilized. Thus a wire 56 may be attached to the die 52 at any desired point 56' and threaded through the opening 55 in the core 54, the wire extending forwardly into the tube 51 carried on belt 57, and a floating plug 58 as shown and described in Figures 1 and 2 attached to the wire 56 to 59. The air pressure in the tube is sufficient in conjunction with the extruding operation to maintain the plug in desired position for its function as set forth above. The apparatus of Figure 5 will thus function exactly in the way described above for Figure 1 to produce large diameter tubing of uniform size maintained within close range of tolerances.

The type of floating plug illustrated in Figure 5 attached to a wire running to the die may be utilized in any of the machines such as those illustrated in Figures 1, 3 and 4 in lieu of the magnetic means for maintaining the floating plug in position.

While the core 4 has been set forth above to be produced of Swedish iron wire, it may be made of any desirable magnetizable material, as for example, Alnico, etc. Whereas in the structure shown in Figure 4, the core 44 is itself utilized as the floating element, and that core is subjected to a solenoid or other magnetizing means to retain it in position, the material of which the floating element 44 is composed, should be of such nature, that it does not adhere so tenaciously to the extruded tubing being formed, as to be withdrawn from its position within the magnetic field created by the solenoid. Materials like brass or stainless steel may desirably be employed.

In connection with the type of material used for such elements it may also be pointed out that such choice of material may depend on the expedient employed for maintaining the floating plug in position. As illustrated herein, a solenoid has been employed to produce a magnetized field which acts on the mandrel or core to hold it in position. However, this is illustrated only for purposes of explanation and exemplification and any other means may be employed in this connection to hold the plug in position within the extruded tube. Thus it is possible to utilize eddy currents or to use induced currents to float a desired plug or device within the extruded tube for these purposes and the choice of material from which the floating element is produced will depend on the exact conditions under which such element is employed.

In connection with the core described herein, it may be pointed out that the eddy currents from the solenoid described herein create a substantial amount of heat if the core is not laminated.

By the methods and means herein set forth, it is possible to extrude thermoplastic tubing particularly of synthetic resinous character, of true bore within a tolerance of one-half of one per cent by continuous extrusion methods avoiding any collapse of the tubing during such manufacture even when cut in any desired predetermined length, such as standard 12 foot length. Extruded tubing of any desired cross-section may be produced such as circular, oval, elliptical, square, hexagonal, etc.

Instead of using floating plugs of substantially solid character as illustrated above, the plug may be made of a porous mass or semipermeable material such as sponge rubber anchored in position by any of the means set forth above between the die and the cutting off apparatus, the mass being sufficiently porous to permit taking up slight variations or permitting adjustment to slight variation in the internal diameter of the tubing being extruded. Figure 6 illustrates the utilization of a plug of this character. As there shown, a wire or other attaching means 66 may be attached to the die 62 at any desired point such as 66' and threaded through the opening 65 in the core 54, the wire extending forwardly into the tube 61 carried on belt 67 and a floating plug 68 attached to the wire 66 at 69. The fluid pressure in the tube is sufficient in conjunction with the extruding operation to maintain the plug anchored in the desired position for its function as set forth above. The plug 68 may be of sponge rubber or other porous material or semi-permeable substance which will maintain a substantially uniform air or fluid pressure in the tubing, the mass being sufficiently porous to permit adjustment to slight variations in the internal diameter of the tubing.

As illustrative of other methods that may be utilized in lieu of floating plugs, reference may be made to Figure 7. In this case the extruded tubing 71 is given a bend as illustrated at 72 to form a trap within which a liquid such as mercury 73 may be introduced to form an air lock. In long lengths of tubing, the tubing itself will bow sufficiently to form the trap. The tubing is cut beyond the trap at a point such as that indicated at 74.

The liquid trap illustrated in Figure 7 may also be used in conjunction with any of the plugs shown above. For example any of the plugs or devices of Figures 1 to 6 inclusive may be used and in addition a trap holding liquid as shown in Figure 7 be employed simultaneously with the plug or device of Figures 1 to 6. Ordinarily both are not necessary, but in some instances may be desirably employed to obtain the added effect. Thus as shown in Figure 8, the tubing 1 may carry a plug 11 as shown in Figure 1 and also the tubing may have a bend 72 to form a trap within which the liquid 73 forms an air lock, the tubing being cut beyond the trap as at 74.

Any desired thermoplastic materials may be utilized in the production of such extruded tubing in accordance with the present invention, particularly synthetic resinous materials such as cellulose derivatives including the esters, particularly cellulose acetate and cellulose acetate butyrate, and the cellulose ethers such as ethyl cellulose; polymerized vinyl materials such as polymerized vinyl acetate, styrenes, and other thermoplastic and resinous compositions that may be extruded in continuous lengths, including the vinyl resins and nylon type resins.

There is an outstanding advantage in the use of the invention in making long coils of tubing of, for example, relatively small diameter such as ⅜ inch O. D. x ¼ inch I. D. in coils of about 1000 feet length. It was found that even under such conditions, the volume of air that leaked past the device was so insignificant that there was no worthwhile friction built up and the necessary tolerances were readily maintained in holding the tubing throughout its length to the shape desired with accuracy of dimension as herein set forth.

While the invention has been particularly illustrated in connection with the production of synthetic resinous tubing by extrusion methods, it may be utilized in connection with other materials and may be employed in the extrusion, particularly where continuous lengths of such products are to be obtained.

This application is a continuation-in-part of Serial No. 487,403 filed May 17, 1943, now abandoned, entitled "Synthetic Resinous Tubing."

Having thus set forth my invention, I claim:

1. The method of manufacturing thermoplastic tubing of fixed bore by extrusion which comprises extruding thermoplastic unconstrained tubing in non-self-sustaining plastic condition, introducing a fluid within the tubing during extrusion to prevent collapse of the unconstrained tubing, maintaining the pressure of the fluid within the unconstrained tubing substantially uniform, cooling the tubing to a temperature at which it is self-sustaining, the pressure being maintained by liquid trapped in the extruded tubing at a point where it is self-sustaining.

2. The method of manufacturing thermoplastic tubing by extrusion which comprises extruding thermoplastic tubing in non-self-sustaining plastic condition, introducing a fluid within the tubing during extrusion to prevent collapse of the tubing, cooling the tubing to a temperature at which it is self-sustaining, cutting the extruded cooled tubing to a predetermined length, and maintaining the pressure of the fluid within the tubing substantially uniform during the operation set forth by liquid trapped in the tubing at a point where it is self-sustaining and by floating a plug within the tubing at a point removed from the point of extrusion and before the point of cutting, to maintain a cushion of fluid in the tubing of substantially uniform pressure.

3. The method of manufacturing thermoplastic tubing by extrusion which comprises extruding thermoplastic tubing in non-self-sustaining plastic condition, introducing a fluid within the tubing during extrusion to prevent collapse of the tubing, cooling the tubing to a temperature at which it is self-sustaining, cutting the extruded cooled tubing to a predetermined length, and maintaining the pressure of the fluid within the tubing substantially uniform during the operation set forth by liquid trapped in the tubing at a point where it is self-sustaining and by floating a metal plug within the tubing between the points of extrusion and cutting and anchoring the plug in position by a wire extending from the plug through the tubing to the extrusion means.

4. The method of manufacturing thermoplastic tubing by extrusion which comprises extruding thermoplastic tubing in non-self-sustaining plastic condition, introducing a fluid within the tubing during extrusion to prevent collapse of the tubing, cooling the tubing to a temperature at which it is self-sustaining, cutting the extruded cooled tubing to a predetermined length, and maintaining the pressure of the fluid within the tubing substantially uniform during the operation set forth by liquid trapped in the tubing at a point where it is self-sustaining and by floating a porous mass within the tubing between the points of extrusion and cutting, the mass being sufficiently porous to permit adjustment to slight variations in the internal diameter of the tubing.

5. Apparatus for manufacturing thermoplastic tubing of fixed bore by extrusion which comprises means for extruding thermoplastic unconstrained tubing in non-self-sustaining plastic condition, means for introducing a fluid within the tubing during extrusion to prevent collapse of the unconstrained tubing, means for maintaining the pressure of the fluid substantially uniform within the unconstrained tubing, and means for cooling the tubing to a temperature at which it is self-sustaining, the pressure maintaining means including liquid trapped in the extruded tubing at a point where it is self-sustaining.

6. Apparatus for manufacturing thermoplastic tubing by extrusion which comprises means for extruding thermoplastic tubing in non-self-sustaining plastic condition, means for introducing a fluid within the tubing during extrusion to prevent collapse of the tubing, means for maintaining the pressure of the fluid substantially uniform within the tubing, means for cooling the tubing to a temperature at which it is self-sustaining, and means for cutting the tubing to a predetermined length, the pressure maintaining means including liquid trapped in the tubing at a point where it is self-sustaining and a floating plug within the tubing between the points of extrusion and cutting, to maintain a cushion of fluid in the tubing of substantially uniform pressure.

7. Apparatus for manufacturing thermoplastic tubing by extrusion which comprises means for extruding thermoplastic tubing in non-self-sustaining plastic condition, means for introducing a fluid within the tubing during extrusion to prevent collapse of the tubing, means for maintaining the pressure of the fluid substantially uniform within the tubing, means for cooling the tubing to a temperature at which it is self-sustaining, and means for cutting the tubing to a predetermined length, the pressure maintaining means including liquid trapped in the tubing at a point where it is self-sustaining and a floating metal plug within the tubing between the points of extrusion and cutting to maintain a cushion of fluid in the tubing of substantially uniform pressure, and means extending from the plug through the tubing to the extrusion means to anchor the plug in position.

8. Apparatus for manufacturing thermoplastic tubing by extrusion which comprises means for extruding thermoplastic tubing in non-self-sustaining plastic condition, means for introducing a fluid within the tubing during extrusion to prevent collapse of the tubing, means for maintaining the pressure of the fluid substantially uniform within the tubing, means for cooling the tubing to a temperature at which it is self-sustaining, and means for cutting the tubing to a predetermined length, the pressure maintaining means including liquid trapped in the tubing at a point where it is self-sustaining and a porous mass anchored between the extrusion means and the cutting means.

CHARLES E. SLAUGHTER.

References Cited in the file of this patent

UNITED STATES PATENTS

| Number | Name | Date |
|---|---|---|
| 2,047,554 | Fischer | July 14, 1936 |
| 2,337,927 | Reichel et al. | Dec. 28, 1943 |
| 2,433,937 | Tornberg | Jan. 6, 1948 |
| 2,461,976 | Schenk | Feb. 15, 1949 |

FOREIGN PATENTS

| Number | Country | Date |
|---|---|---|
| 3,999 | Great Britain | July 25, 1891 |